United States Patent [19]

Burton et al.

[11] Patent Number: 5,407,030

[45] Date of Patent: Apr. 18, 1995

[54] RECALIBRATING AN ELEVATOR LOADWEIGHING SYSTEM

[75] Inventors: Douglas Burton, Unionville; Eric K. Jamieson, Farmington, both of Conn.

[73] Assignee: Otis Elevator Company, Farmington, Conn.

[21] Appl. No.: 27,309

[22] Filed: Mar. 4, 1993

[51] Int. Cl.⁶ .................... G01G 19/14; B66B 1/44; B66C 13/14
[52] U.S. Cl. .................... 187/392; 187/292; 212/158; 177/264
[58] Field of Search ............ 364/571.04, 571.02, 364/550; 187/115, 116, 131, 112, 130, 132; 212/158

[56] References Cited

U.S. PATENT DOCUMENTS

| | | | |
|---|---|---|---|
| 4,754,850 | 7/1988 | Caputo | 187/115 |
| 4,793,442 | 12/1988 | Heckler et al. | 187/115 |
| 4,939,679 | 7/1990 | David et al. | 364/571.04 |
| 5,172,782 | 12/1992 | Yoo et al. | 177/147 |
| 5,343,003 | 8/1994 | Jamieson et al. | 187/131 |

Primary Examiner—Steven L. Stephan
Assistant Examiner—Robert Nappi

[57] ABSTRACT

Armature current $I_{ARM}$ is used to dynamically recalibrate the elevator loadweighing system, thereby eliminating errors in the load (% LOAD) reported from the loadweighing system which are a linear function of the actual weight. Errors in the load (%. LOAD) reported from the loadweighing system which are a nonlinear function of the actual weight are minimized by sampled % LOAD values and corresponding actual weight values (% WGT), then mapping sampled % LOAD values to the corresponding % WGT values and providing the % WGT values to the drive instead of the received % LOAD values.

2 Claims, 7 Drawing Sheets

ARMATURE
CURRENT
(AMPS)

Iarm1

0   -% OB          100-% OB      % LOAD
         OB_CORRECT

Iarm0

% OB = % OVERBALANCE $$MBIAS = \frac{Iarm1 - Iarm0}{100} = \frac{Iarm0}{\%\ OB + \%\ OB\_CORRECT}$$

FIG. 7

| % WGT(kg) | % LOAD | NEW % LOAD |
|---|---|---|
| 0 | 20 | 20 |
| 50 | 40 | |
| 100 | 90 | |
| 150 | 140 | |
| 200 | 190 | |

$\underbrace{\qquad\qquad\qquad}_{MAP}$

FIG. 6A
IDEAL CONDITION

FIG. 6B
SIGNAL CLIPPING DUE TO GAIN ERROR

FIG. 6C
SIGNAL CLIPPING DUE TO OFFSET ERROR

FIG. 6D
SIGNAL CLIPPING DUE TO JACK-BOLT TYPE ERROR

RECALIBRATING AN ELEVATOR LOADWEIGHING SYSTEM

TECHNICAL FIELD

The present invention relates to dynamic recalibration of an elevator loadweighing system.

BACKGROUND OF THE INVENTION

There are two problems: (a) elevator rollback and rollforward prior to start of a normal run and (b) calibration of the loadweighing system. These problems relate to operation of the elevator (a) during installation and (b) after installation, respectively.

Movement of the car prior to being commanded to run at the start of a normal run can lengthen the run time because the car must be re-leveled and brought to a standstill before going on a run. Unintended movement of the car may occur if pre-torque armature current applied to an elevator drive motor is incorrect so that the car does not stay still after the brake is lifted. This causes passenger discomfort.

Armature current is proportional to the load on the car:

$$T = K_T I_{ARM},$$

$$(R)(LOAD - OVERBALANCE) = K_T I_{ARM},$$

$$I_{ARM} = \frac{R}{K_T}(LOAD - OVERBALANCE),$$

$$\frac{LOAD}{MAX\ LOAD} = \%\ LOAD,$$

$$\frac{OVERBALANCE}{MAX\ LOAD} = \%\ OVERBALANCE$$

$$\%\ LOAD - \%\ OVERBALANCE = \frac{LOAD - OVERBALANCE}{MAX\ LOAD}$$

where $I_{ARM}$ is the armature current;
$K_T$ is a torque constant;
R is the length of the torque arm;
LW is the load weight, the force tangent to the sheave which may be expressed as % LOAD (the weight in the car as a percentage of full load) minus % OVERBALANCE; and
T is the torque.

The two problems are as follows:

(1) At installation, the drive must be adjusted to provide an armature current during pre-torque (bias current) to keep the car from moving when the brake is lifted prior to a run. A parameter MBIAS scales bias torque based on the overbalance, in the car (that is, when the car is carrying full load, the motor is carrying full load minus the overbalance); the overbalance is the portion of the counterweight greater than the weight of the car (% OVERBALANCE). The drive receives loadweighing information from the car controller, formatted as a percentage offset from the weight of a balanced car; thus, empty car load is zero minus overbalance. Thus, MBIAS and % OVERBALANCE must be properly adjusted at installation to give accurate pre-torque armature currents. A method to quickly and accurately set these parameters is needed. Presently, these numbers are entered from a table, with MBIAS being adjusted in an imprecise manner at installation to give approximately the right pre-torque value, usually based on load in the car.

$$MBIAS * (\%\ LOAD - \%\ OVERBALANCE) = I_{ARM}$$

$$MBIAS * \frac{(LOAD - OVERBALANCE)}{MAX\ LOAD} = I_{ARM}$$

so $$\frac{MBIAS}{MAX\ LOAD} = \frac{R}{K_T};$$

so $$MBIAS = \frac{R(MAX\ LOAD)}{K_T},\ \text{excluding}$$

any scaling constants. Thus, MBIAS is a multiplier to change a % LOAD value expressed as a percentage of full load into amperes of armature current $I_{ARM}$.

(2) After installation and during the life of an elevator, loadweighing must be periodically re-adjusted to keep the pre-torque current accurate enough to prevent unintended motion of the car after the brake is lifted. This expensive procedure requires the transport of heavy weight carts to and from the job site to recalibrate the loadweighing gain and offset in the controller. The weights in the weight carts are used as the recalibration standard. Some better method of compensating for drift in the loadweighing system is needed.

DISCLOSURE OF THE INVENTION

Objects of the invention include: (a) dynamically recalibrating the loadweighing system, and (b) to use a calibration standard weight only once, on installation, of an elevator loadweighing system rather than repeatedly, for recalibration.

The invention is predicated on the observation that if the % OVERBALANCE never changes, then for a particular load the pre-torque armature current will not change. This predictability makes that armature current useful as a reference for dynamic recalibration of the elevator loadweighing system.

According to the present invention, armature current $I_{ARM}$ is used to dynamically recalibrate the elevator loadweighing system, thereby eliminating errors in the load (% LOAD) reported from the loadweighing system which are a linear function of the actual weight.

In still further accord with the present invention, errors in the load (% LOAD) reported from the loadweighing system which are a nonlinear function of the actual weight are minimized by sampled % LOAD values and corresponding actual weight values (% WGT), then mapping sampled % LOAD values to the corresponding % WGT values and providing the % WGT values to the drive instead of the received % LOAD values. The standard for calibration is the amount of armature current required to hold the motor at zero velocity after the brake is lifted but before the elevator car is commanded to move; % WGT is derived from this armature current. The corrected % LOAD data may then be sent to the drive for determining a pre-torque armature current gain (MBIAS) and % OVERBALANCE as discussed here.

In still further accord with the present invention, % LOAD samples collected, and car weight data derived from samples of pre-torque armature current $I_{ARM}$, are used to map correction values which are added to % LOAD data received from the loadweighing system, thereby reconciling the % LOAD with the weight as calculated using the armature current $I_{ARM}$. As before, the standard for calibration is the amount of armature current required to hold the motor at zero velocity after the brake is lifted but before the elevator car is commanded to move; % WGT is derived from this armature current. The corrected % LOAD data may then be sent to the drive for determining a pre-torque armature current gain (MBIAS) and % OVERBALANCE as discussed here.

BEST MODE EMBODIMENT FOR CARRYING OUT THE INVENTION

The present invention addresses three problems:

(a) determining, during installation, pre-torque current required to avoid rollback and rollforward, (b) determining pre-torque current in such manner as to avoid rollback and rollforward in an ongoing manner by compensating for drift in operation of a loadweighing system, and (c) recalibrating a loadweighing system. These three problems are specifically and respectively addressed below in Sections A, B, and C.

Figure 1:
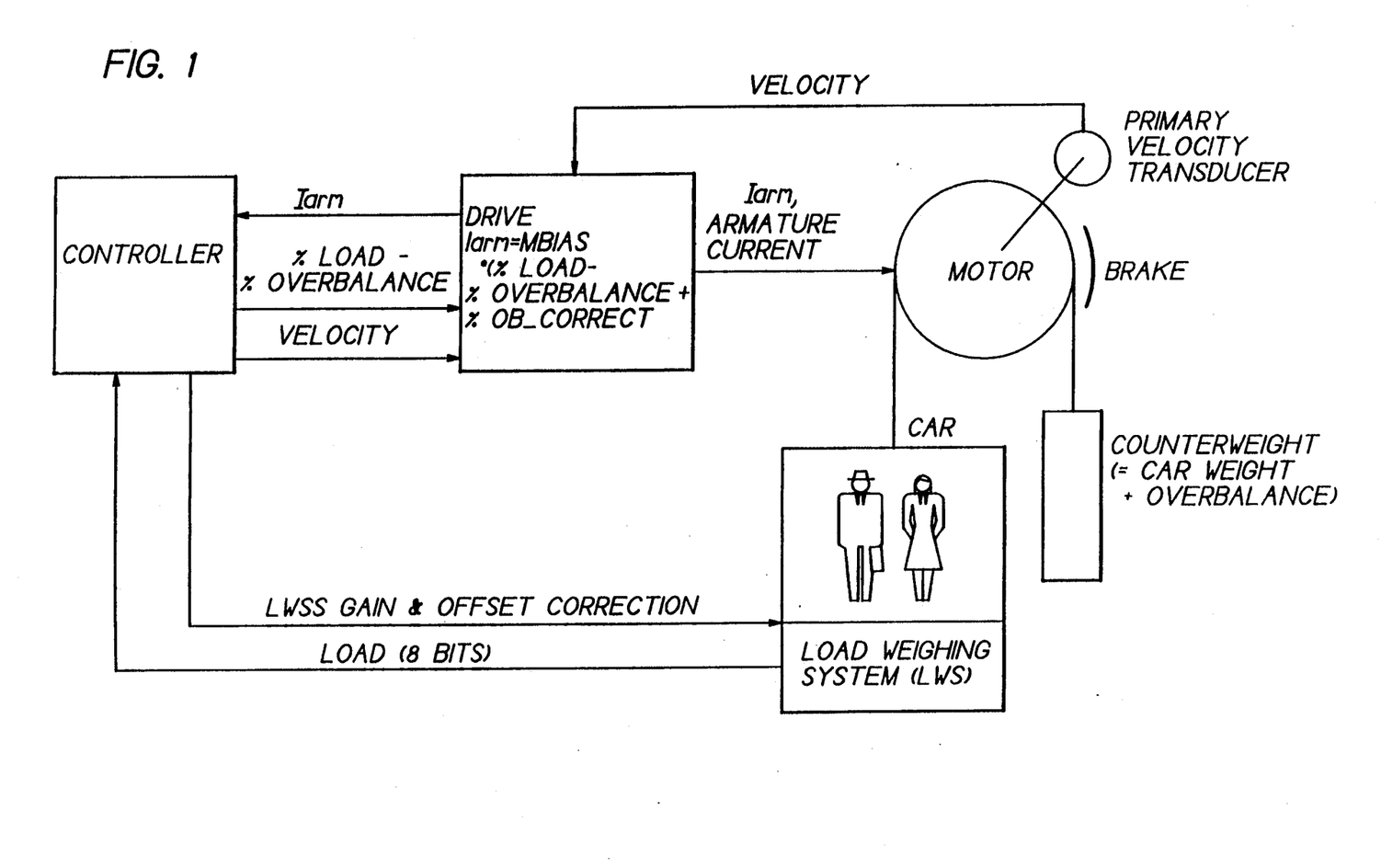
FIG. 1 is a block diagram of an elevator loadweighing system.

FIG. 1 shows a car for hoisting passengers by rotation of a DC motor. The car is counterweighted by means of a counterweight connected to a rope which is connected to the car. The weight of the counterweight is equal to the weight of the empty car plus an overbalance weight approximately equal to 42% of maximum load in the car. A brake stops the car when commanded by a drive. The speed of the motor is measured by a primary velocity transducer (PVT) which feeds back the velocity to the drive. A loadweighing system beneath the car provides measured load of the car to a controller. The controller in turn provides gain and offset signals to the loadweighing system for recalibrating the loadweighing system. In response to the load signal provided and an estimated overbalance value fed into the controller prior to installation, the controller converts pounds in the load signal into a % LOAD (pounds) which is the load in the car as a percentage of the full load. The controller then provides a difference signal, equal to % LOAD minus the % OVERBALANCE (which is typically 42% of full load) to the drive along with a velocity command. Given this estimate of the load in the car, the drive can generate an armature current $I_{ARM}$ needed to turn the DC motor and also to provide a pre-torque current which does not allow the car to roll back or cause the car to roll forward after the brake is lifted and prior to commanding movement of the car. According to the invention, this armature current $I_{ARM}$ is:

$$I_{ARM} = MBIAS*(\% \text{ LOAD} - \% \text{ OVERBALANCE} + \% \text{ OBCORRECT})$$

So that the controller can produce a loadweighing system gain signal and loadweighing system offset signal for recalibrating the elevator loadweighing system, the drive feeds back armature current $I_{ARM}$ to the controller.

A. Pre-Torque Armature Current Determined on Installation

Figure 2:
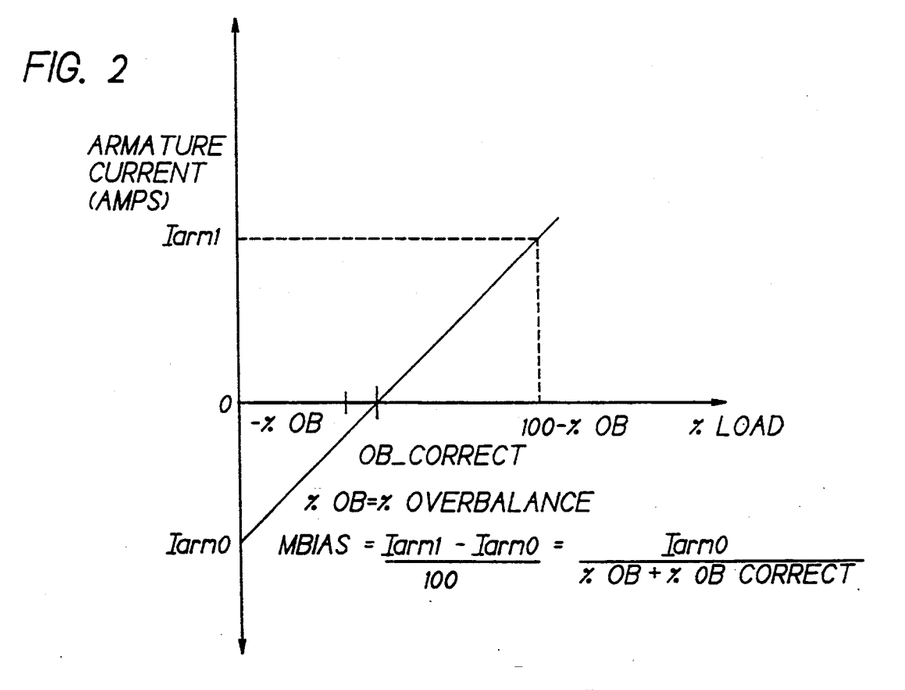
FIG. 2 is a graph of loadweight as a percentage of full load versus armature current $I_{ARM}$ (amperes).

It is possible to know the load in a car at two points: empty car and full car. The controller loadweighing gain and offset parameters can be calibrated to be within one percent (1%) for these two points and therefore an equally accurate % LOAD value at these points can be obtained for use in obtaining MBIAS. Next, assume that MBIAS is unknown, and % OVERBALANCE is not necessarily accurate and therefore also might as well be unknown. If the car is held at zero velocity after the brake is lifted, then the armature current $I_{ARM}$ applied to hold the empty car at zero velocity is the same as the required pre-torque armature current $I_{ARM}$; the same argument applies at full load. The equation relating armature current to load in the car is:

$$MBIAS*(\% \text{ LOAD} - \% \text{ OVERBALANCE}) = I_{ARM}$$

where (% LOAD−% OVERBALANCE) is the load reported by the controller to the drive and $I_{ARM}$ is the armature current. This equation comes from a known equation for relating armature current $I_{ARM}$ to motor torque and loadweight:

$$I_{ARM} = \frac{T}{K_T} = \frac{R*LW}{K_T} \qquad \text{(Equation 1)}$$

where
- $K_T$ is a torque constant;
- T is motor torque;
- R is length of the torque arm; and
- LW is the weight of the car load on the motor = % LOAD − % OVERBALANCE Relating the above equation to the standard form for a straight line, Y equals $I_{ARM}$, M equals MBIAS, X equals (% LOAD − % OVERBALANCE), and B equals zero, ideally. MBIAS therefore functions as a pre-torque armature current gain. Thus, to determine the proper values for MBIAS, the following procedure can be used at installation:

1. With empty car, determine the armature current $I_{ARM}$ required to hold the car at zero velocity with the brake lifted. This is $I_{ARM0}$ (see FIG. 2).
2. With full car load, determine the armature current $I_{ARM}$ required to hold the car at zero velocity with the brake lifted. This is $I_{ARM1}$ (see FIG. 2).
3. Calculate MBIAS using the following equation:

$$MBIAS = (I_{ARM1} - I_{ARM0})/100 \quad \text{(Equation 2)}$$

which is derived from the drawing using similar triangles.

4. If the % OVERBALANCE setting in the controller is not correct, then there will be an overbalance error in the pre-torque current calculation, rollback or rollforward if the % OVERBALANCE setting is too high or too low, and a corresponding non-zero velocity signal. The Y-intercept in the FIG. 2 graph of % LOAD versus $I_{ARM}$ "B" is not zero here, as it is in the ideal case. To compensate for this and correct the % OVERBALANCE setting, an overbalance correction (% OBCORRECT) must be introduced into Equation (1) as follows:

$$I_{ARM} = MBIAS*(\% \text{ LOAD} - \% \text{ OVERBALANCE} + \% \text{ OBCORRECT}) \quad \text{(Equation 3)}$$

Next, the overbalance correction can be calculated using the following equation:

$$\% \text{ OBCORRECT} = \frac{I_{ARM0}}{MBIAS} + \% \text{ OVERBALANCE} \quad \text{(Equation 4)}$$

which is derived from Equation 3 for empty car (that is, % LOAD=0).

The % OBCORRECT can be applied to all subsequent loadweighing reports (as shown in FIG. 1) from the controller or used to correct the % OVERBALANCE setting in the controller. Either way, OFFSET is used to generate pre-torque armature current $I_{ARM}$ which avoids rollback and rollforward.

Figure 3:
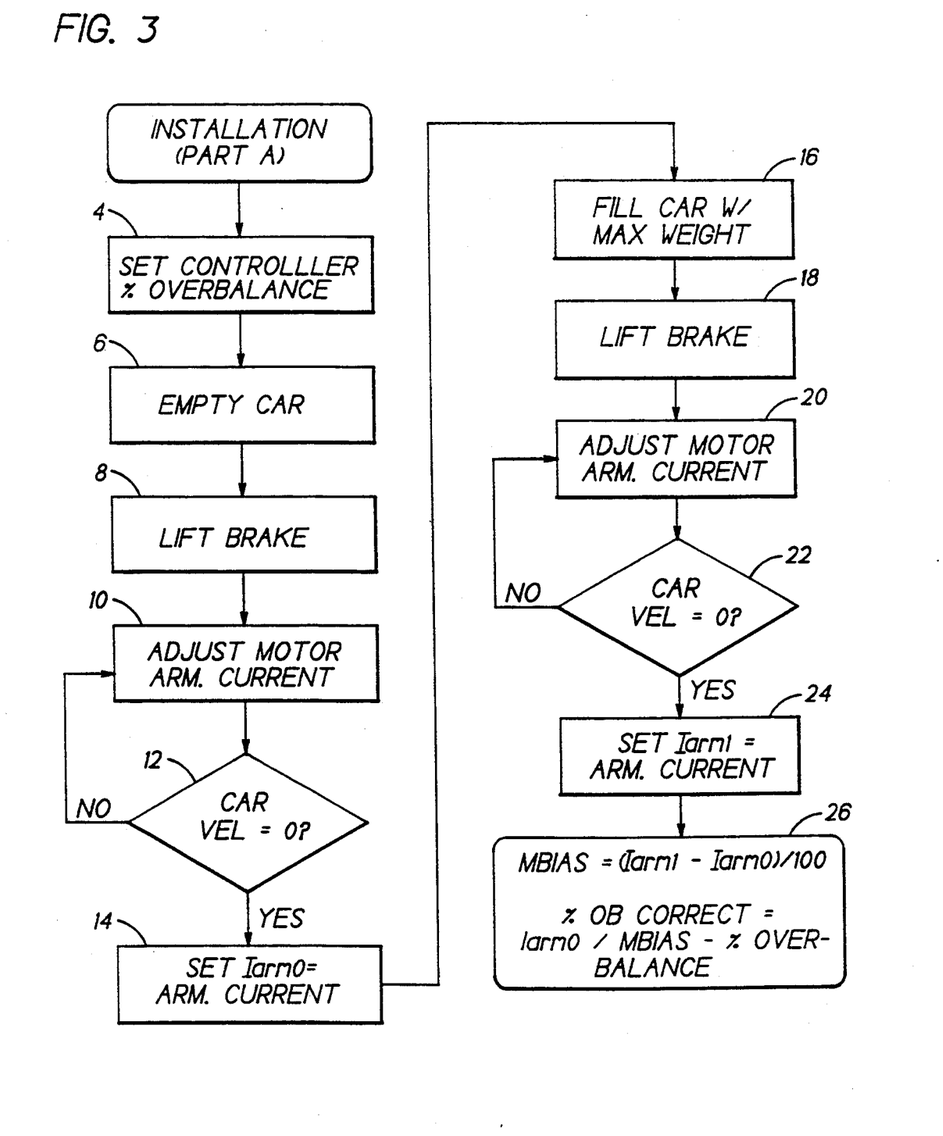
FIG. 3 is a flow chart for producing a pre-torque armature current gain (MBIAS) and % OVERBALANCE.

FIG. 3 shows a flow chart, for implementation by the apparatus of FIG. 1 with the software residing in the drive, for providing a pre-torque armature current gain MBIAS and a pre-torque % OBCORRECT. The routine of FIG. 3 is implemented once on installation, prior to running the car with passengers. First, a % OVERBALANCE value estimated to be some percentage of full load, for example, 42%, is stored, step 4. Next, the car is emptied, step 6, and the drive commands the brake to lift and it is lifted, step 8. After the brake has been lifted, the DC motor armature current $I_{ARM}$ is adjusted up or down until the car velocity fed back by the PVT equals zero, steps 10-12, at which point an empty car armature current value is stored in the drive, step 14. Following this step 14, the first of two points used to determine the linear relationship between the armature current $I_{ARM}$ and the % LOAD is determined. The empty car armature current, $I_{ARM0}$, is the pre-torque current for an empty car with no rollback or rollforward. Next, the car is filled with a calibrated weight standard, step 16, and then the brake is lifted a second time, step 18, and the armature current $I_{ARM}$ is adjusted, step 20, until the car velocity is equal to zero, step 22. After this step 22, a second point in the linear relationship between the armature current $I_{ARM}$ and % LOAD has been determined, step 4. The full car armature current $I_{ARM1}$ is the pre-torque armature current $I_{ARM}$ without rollback or rollforward at full load.

The pre-torque armature current gain MBIAS is calculated, and the pre-torque % OBCORRECT is calculated, step 26. The % OBCORRECT calculation can be applied to all subsequent loadweighing reports from the controller (as shown in FIG. 1) or fed back to the controller for correcting the % OVERBALANCE setting stored there. When the calculated $I_{ARM}$ is calculated from the above MBIAS and % OBCORRECT, the car does not roll back or roll forward upon mere lifting of the brake.

The gist of this first portion of the invention is the use of two pre-torque armature current points measured with no rollback and no rollforward to determine a relationship between armature current $I_{ARM}$ and % LOAD that generates a pre-torque armature current gain (MBIAS), and a % OBCORRECT which compensates for a false % OVERBALANCE setting.

B. Pre-Torque Armature Current Gain Determination to Accommodate Changes in Loadweighing System During a typical run, the following simplified sequence of events occurs:
(1) The controller issues a prepare-to-run command, which causes the drive to start the pre-torque sequence. The drive latches the last received loadweighing information from the controller and sets the armature current $I_{ARM}$ to the pre-torque value derived from the % LOAD and MBIAS. The drive reports ready-to-run back to the controller.
(2) The controller issues a lift brake command; the drive reports back once the brake has been lifted. The controller then either starts its normal velocity profile dictation or, if the car has moved due to improperly set bias torque, it starts a re-leveling dictation until the car stops moving.
(3) At the end of the normal run, the controller dictates zero velocity prior to issuing a drop brake command.

Two pieces of information are available to the drive: load in the car (as a percentage offset from balanced car condition) and armature current $I_{ARM}$ at zero velocity (just prior to dropping the brake). By sampling these values over some number of runs, it is possible to derive a linear function of form $Y = MX + B$ that minimizes the error between the actual samples and the predicted samples. Applying the method of least-squares, also called linear regression, it is possible to develop corrections to the MBIAS and % OBCORRECT parameters to compensate for drift in the performance of the loadweighing circuitry through, for example, aging and temperature changes. The corrected values for MBIAS and % OBCORRECT can then be used to set the proper bias torque based on reported load and the car prior to each run. A "moving window" of past samples ensures that, as loadweighing continues to drift, MBIAS and OFFSET would be continually adjusted to compensate, thus reducing or eliminating maintenance calls to recalibrate the loadweighing system.

The algorithm applies the method of least-squares, also referred to as linear regression, to the last samples of percentage load in the car (% LOAD) versus armature current $I_{ARM}$ prior to dropping the brake. The equations are summarized below:

$$MBIAS = \frac{n * \Sigma(\% \text{ LOAD} * I_{arm}) - \Sigma(\% \text{ LOAD}) * \Sigma(I_{arm})}{n * \Sigma(\% \text{ LOAD}^2) - (\Sigma(\% \text{ LOAD}))^2}$$

$$\% \text{ OBCORRECT} = \frac{\Sigma(I_{arm}) - MBIAS * \Sigma(\% \text{ LOAD})}{n * MBIAS}$$

where sum (argument) is the summation of the last n values of the argument.

Three problems associated with the above algorithm are: (1) correction values that are biased toward either full car or empty car conditions, (2) variations in load-weighing accuracy due to car position in the hoistway, and (3) advanced door opening. The first problem will arise if a car runs for long periods of time with either full load or empty load; the more likely case being empty or lightly loaded. In this case, correction values will be computed based on a narrow spread of load-weighing versus armature current samples, which may cause incorrect bias torque to be applied the next time the car is heavily loaded if the samples were taken when the car was lightly loaded. To avoid this problem, the software must enforce a proper distribution of the data points throughout the operating range of the car. This is accomplished by establishing load ranges in which data samples may be taken, and then calculating correction values only after samples have been taken in each of the ranges.

With respect to the second problem, during a run from the top to the bottom of a hoistway (and vice versa) the loadweighing system output can vary by as much as plus or minus five percent; tests have shown that the output variation correlates with car position and is probably due to flexing of the car, that is spindling of the floor platform, at various points in the hoistway. The variation introduces an error in the data points used to determine the correction value; however, inasmuch as the error is randomly distributed throughout the hoistway, it should wash out of the least-squares algorithm if: (a) enough samples are included in each calculation and (b) if the samples are taken at random points in the hoistway.

The third problem, advance door opening, would allow the load in the car to change prior to the car being held at zero velocity. This negates any relationship between reported load from the controller (% LOAD−% OVERBALANCE) and armature current $I_{ARM}$. However, this can be circumvented by sampling the armature current $I_{ARM}$ prior to the start of a normal run, rather than at the end of a normal run. After the brake picks up, the drive operates in a velocity control mode. At this point, if there is any motion due to an incorrect bias torque setting, the drive adjusts the armature until zero velocity is achieved. If the armature current sample is taken at this point, it will correlate correctly with the load in the car.

The gist of this second portion of the invention is that by continually adjusting MBIAS and % OBCORRECT in the drive to give the correct armature current value for a given load in the car, the effect of loadweighing inaccuracies on percentage $I_{ARM}$ calculation and therefore rollback/rollforward can be compensated for and maintenance calls correspondingly reduced.

Figure 4:
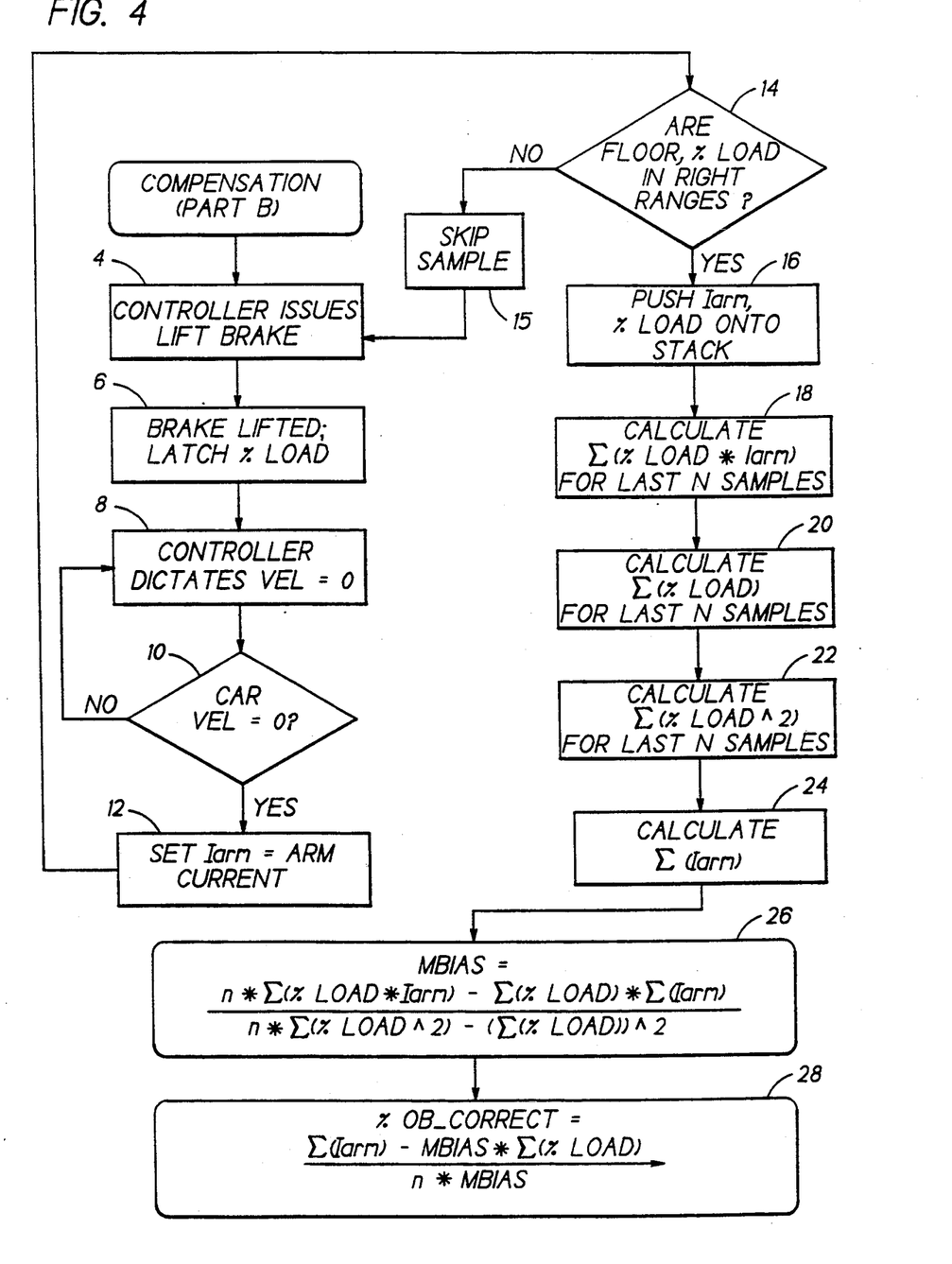
FIG. 4 is a flow chart for sampling the % LOAD and armature current $I_{ARM}$ for continually producing a pre-torque gain (MBIAS) and offset (OFFSET).

FIG. 4 shows a routine for accomplishing this. The routine of FIG. 4 is executed each car run.

In FIG. 4, the first few steps are the same as the first few steps in the routine of FIG. 3 (and also in FIG. 6), that is, the controller issues a lift brake command, step 4, the brake is lifted, step 6, % LOAD is stored in controller memory, step 6, and armature current $I_{ARM}$ is stored at zero car velocity (when the car is neither rolling back nor rolling forward), steps 8, 10, 12. For solving the two problems above: (a) correction values are biased toward a particular load range and (b) variation in load weight due to hoistway position of the car, there is step 14. Step 14 ensures that unless the car is in a desired selectable hoistway position and the load in the car is in the range desired, a sample of armature current $I_{ARM}$ and % LOAD is skipped, step 15. But if the floor is in the desired position and the % LOAD in the desired range, then armature current $I_{ARM}$ is stored, step 16. Next, throughout several runs, % LOAD and $I_{ARM}$ are sampled, stored, and used for calculating values in the linear regression calculation, steps 18, 20, 22, 24. Finally, steps 26, 28, new pre-torque current gain MBIAS and % OBCORRECT are calculated for the same purposes as in FIG. 3.

C. Dynamic Recalibration of Loadweighing System Using Armature Current as a Recalibration Standard The extent to which the routines described in FIGS. 3 and 4 minimize rollback/rollforward depends on the accuracy of the loadweight signal % LOAD provided to the drive and used there to arrive at MBIAS, % OBCORRECT and armature current $I_{ARM}$. Two obstacles to minimizing rollback/rollforward are errors which are a linear function of the actual weight of the car and errors which are a non-linear function of the actual weight of the car.

The gist of this portion of the description of the present invention is that if the % OVERBALANCE does not change, then the pre-torque armature current $I_{ARM}$ at a given load should not change either and therefore can be used as a recalibration standard for the loadweighing system. This does not mean that weight carts are never as weight standards, but it does mean that the carts are only used for calibration, not for recalibration. Further, errors in the % LOAD which have a non-linear relationship to the actual weight can be eliminated by mapping the actual weight against the % LOAD at various actual weights such that the controller can provide the drive with the actual weight in the car for a % LOAD received.

Figure 5:
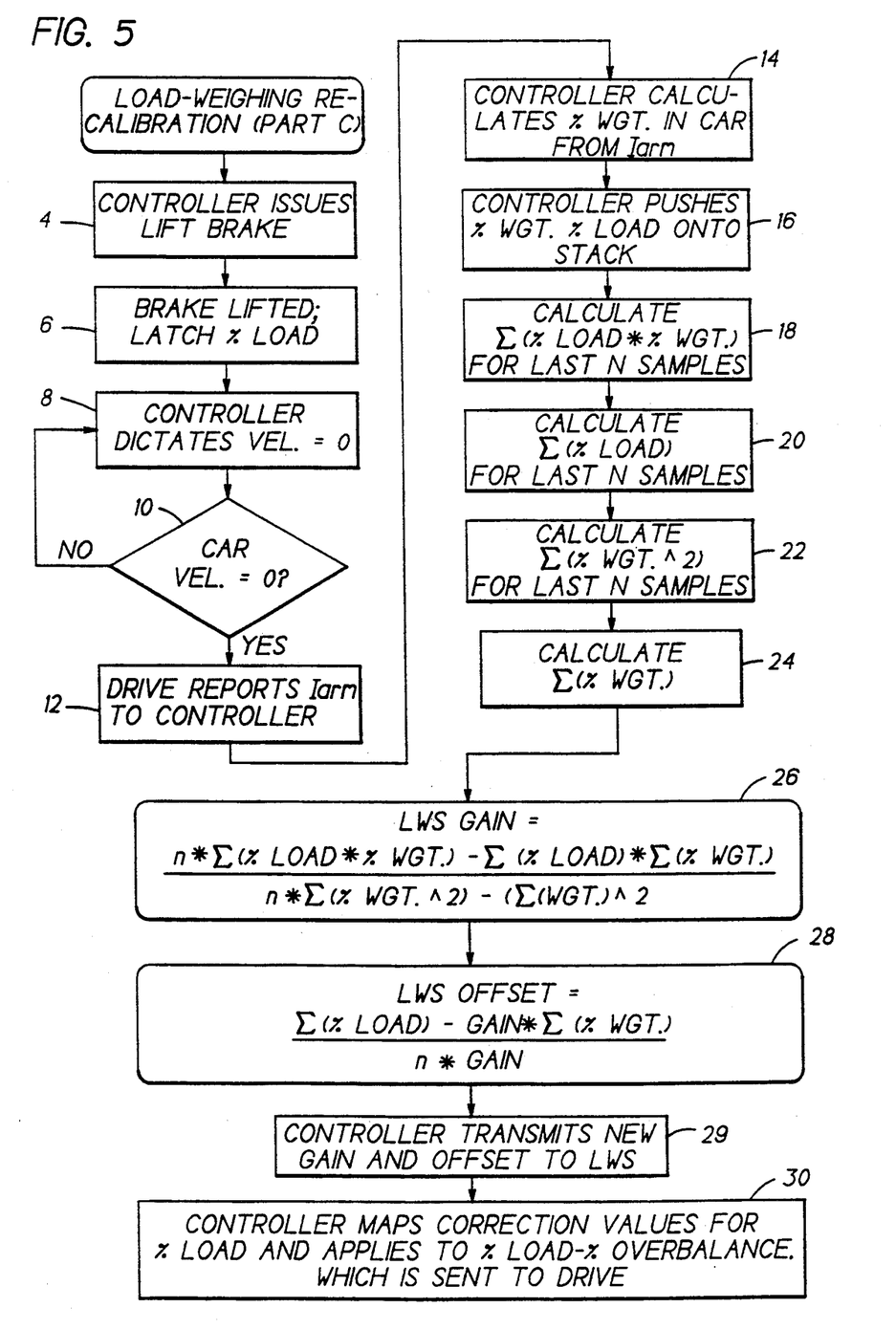
FIG. 5 is a flow chart for producing a loadweighing system gain and offset.

Errors which are a linear function of actual weight can be corrected by sampling values of actual weight, sampling corresponding values of % LOAD and by means of a linear regression providing a new leadweight system gain and offset. As long as the hoist system is not altered physically, the amount of current required for pre-torquing at a given load will not change: $I_{ARM0}$ defines the required current for empty car; $I_{ARM1}$ defines the current required at 100% load. Thus, at the beginning or end of every normal run, when the drive is regulating at zero velocity, the armature current $I_{ARM}$ is equal to the pre-torque current.

$$\text{Thus, } \% \text{ WGT} = 100 * \frac{[I_{ARM} - I_{ARM0}]}{[I_{ARM1} - I_{ARM0}]} \quad \text{(Equation 5)}$$

where % WGT is the actual % duty load in the car and $I_{ARM}$ is the armature current required to hold the car level at the end or beginning of a run. Samples of this actual loadweight % WGT can be provided to the controller for the purpose of dynamic recalibration of the loadweight system. FIG. 5 shows a routine for recalibrating the loadweight system by means of linear regression, thereby minimizing errors which are a linear function of the actual weight in the car. Similar to FIGS. 3 and 4, the first few steps have to do with determining the armature current. First, the controller issues a command for the brake to be lifted, step 4, the brake is lifted and the % LOAD signal given by the loadweighing system is latched in the controller, step 6. The controller dictates zero velocity and the drive reports the armature current $I_{ARM}$ at that velocity to the controller, steps 8, 10, 12. In the controller, the weight in the car is calculated according to above equation 5, step 14, and stored, step 16. The next four steps concern sampling % LOAD and calculating the linear regression values given the samples of % WGT and % LOAD, steps 18, 20, 22, 24. Execution of steps 26 and 28 produces, step 29, a new loadweighing system gain and offset which minimizes errors which are a linear function of the actual loadweight. The routine of FIG. 5 may be executed each run of the car.

Figure 6A:
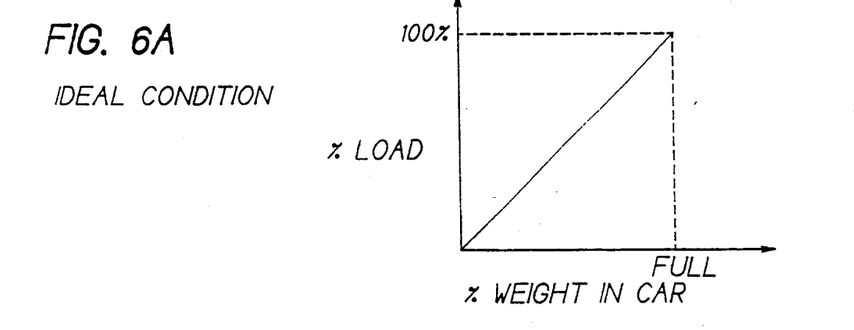
FIG. 6A is a graph of % LOAD v. % Weight in car under ideal conditions.

FIGS. 6A, B, C, D are graphs of % LOAD reported by the loadweighing system as a function of the weight in the car under various conditions.

In FIG. 6A, under the ideal conditions shown, the relationship between % LOAD reported by the loadweighing system is 1:1 with the actual weight, and there is complete agreement between them from no load to full load.

Figure 6B:
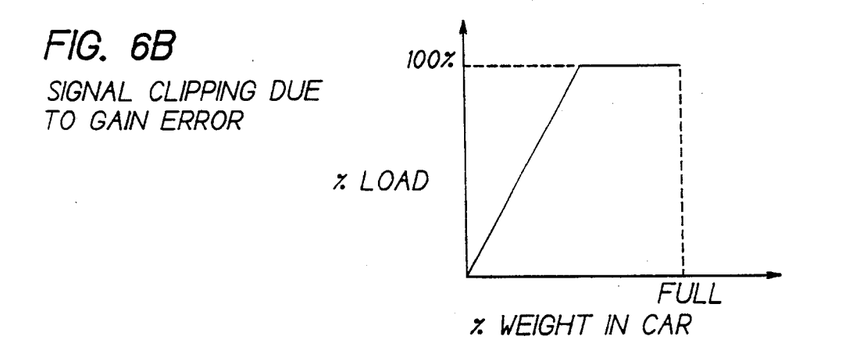
FIG. 6B is a graph of % LOAD v. % Weight in a car under conditions of signal clipping due to grain error.

In FIG. 6B, the % LOAD signal is clipped due to a gain error in the loadweighing system.

Figure 6C:
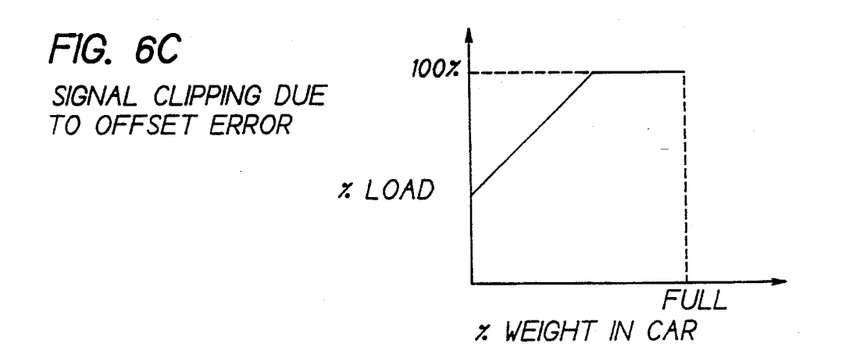
FIG. 6C is a graph of % LOAD v. % Weight in car under conditions of signal clipping due to offset error.

In FIG. 6C, the % LOAD signal is clipped due to an error in the offset of the loadweighing system.

Figure 6D:
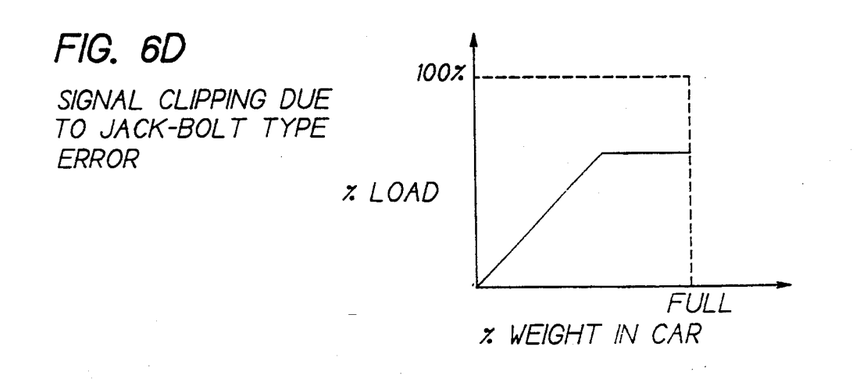
FIG. 6D is a graph of % LOAD v. % Weight under conditions of signal clipping due to Jack-bolt type error.

In FIG. 6D, the % LOAD signal is clipped due, not to an error in the electronics of the leveling system, but rather to a mechanical problem. U.S. Ser. No. 07/792,972, "Elevator Loadweighing at Car Hitch," by Young S. Yoo and U.S. Pat. No. 5, 172,782, "Pivot Mount of Elevator Loadweighing at Car Hitch," issued to Young S. Yoo et al., show a jack bolt in an elevator loadweighing system for making sure that excessive load on the load cell does not destroy the load cell. The jack bolt should be installed such that the load cell is capable of registered full load but is protected from any load greater than that. If, however, the jack bolt is installed improperly or somehow becomes affected so that it not only protects the load cell but prevents it from registering full load, the result is as shown in FIG. 6D. A jack-bolt error may also be present in FIG. 6C, but it may be hidden because of the offset error. Once the linear regression routine of steps 4-29 is run and the loadweighing system offset is corrected, an offset error can no longer hide a jack-bolt type error.

Figure 7:
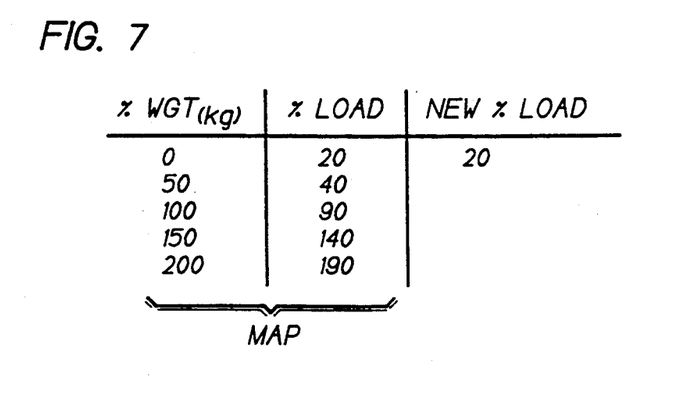
FIG. 7 is a map of % LOAD and % WGT.

The linear regression algorithm of FIG. 5, steps 4-28, may not completely compensate for these non-linear errors shown in FIGS. 6B, 6C, 6D. To minimize these errors, after the controller provides a new gain and offset to the loadweighing system, step 29, the controller maps correction values for % LOAD and applies this in the value (% LOAD−% OVERBALANCE) which is sent to the drive. See step 30. Such a map is shown in FIG. 7. This mapping is accomplished by mapping the actual weight as a percentage of rated load (% WGT) samples of FIG. 5 to corresponding % LOAD samples during installation and after execution of steps 4-28 of FIG. 5. When this map is complete, new % LOAD samples are matched up with actual weight (% WGT) is provided as a correction value for % LOAD. For example, if a % LOAD value of 20 is received; that value would be mapped to zero according to the map. If a % LOAD value does not match with a % WGT value, interpolation provides an appropriate % WGT value.

Figure 8:
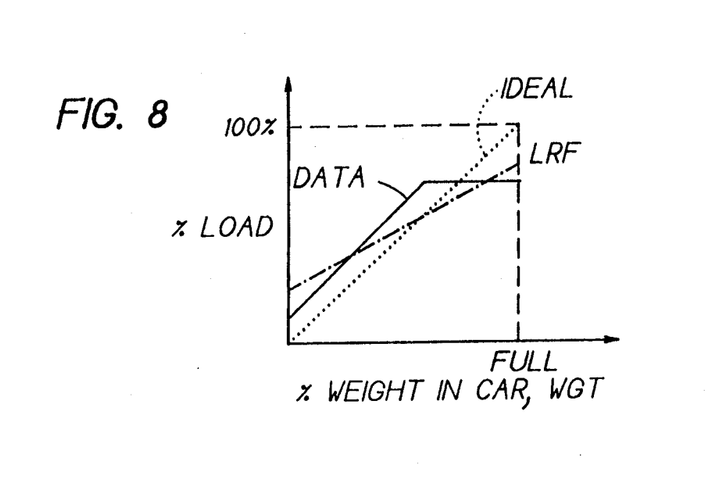
FIGS. 8, 9, 10, and 11 are graphs of % LOAD v. % WGT in car.
Figure 9:
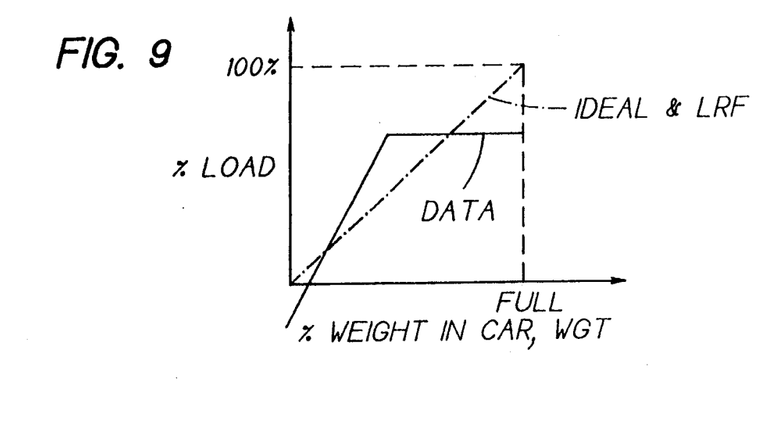

FIG. 8 shows % LOAD data plotted against weight in the car. Also shown is the line which is the best linear regression fit to the data. LRF: LINEAR REGRESSION FIT; the line constructed by linear regression to fit the data. The data show an offset clipping in the loadweighing system and there is also a gain error. A new gain and offset provided to the loadweighing system result in new % LOAD data as shown in FIG. 9. Apparently, correction of linear errors does not solve all problems with % LOAD data from the loadweighing system. Data received are still piece-wise linear and still do not represent the actual weight. The line which best fits the piecewise linear data according to the linear regression routine of FIG. 5, steps 4-28, already overlaps the ideal, and therefore use of linear regression to alter loadweighing system gain and offset cannot provide any further benefit. Therefore, mapping, as shown in step 30, is done to bring the % LOAD data into line with the actual weight.

Figure 10:
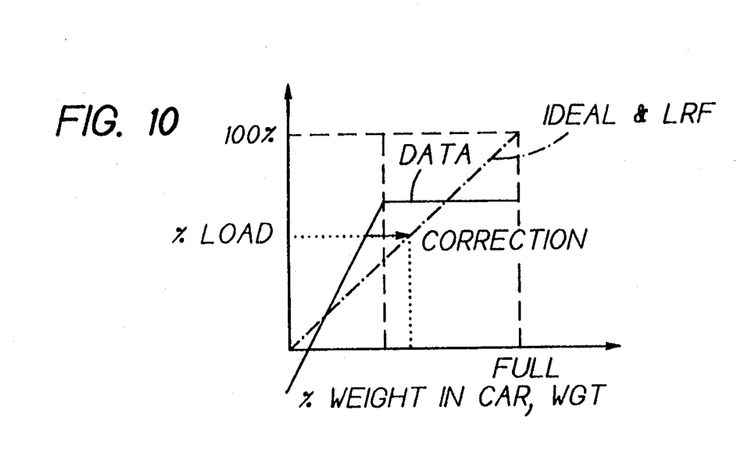

FIGS. 8 and 9 show why a new gain and offset after mapping are not provided to the loadweighing system. FIG. 8 shows linear regression of data received. The ideal, actual weight is shown. New gain and offset cause data received are shown in FIG. 9. Note in FIGS. 9 and 10 that there is a negative offset by the same amount as there was a positive offset in FIG. 8. The linear regression of these data is the same as the ideal weight and therefore the only way to make the % LOAD data match up with the ideal, actual weight (waveform 101) is up to the point of clipping by the mapping of step 30, FIG. 5, as shown in FIG. 10. Note: The graphs in FIGS. 8, 9, 10 depict jack-bolt type clipping, which is not correctable beyond the point where the jack-bolt is clipping the signal. However, the correction mapping does improve performance for the region where the loadweighing system is still operating.

Figure 11:
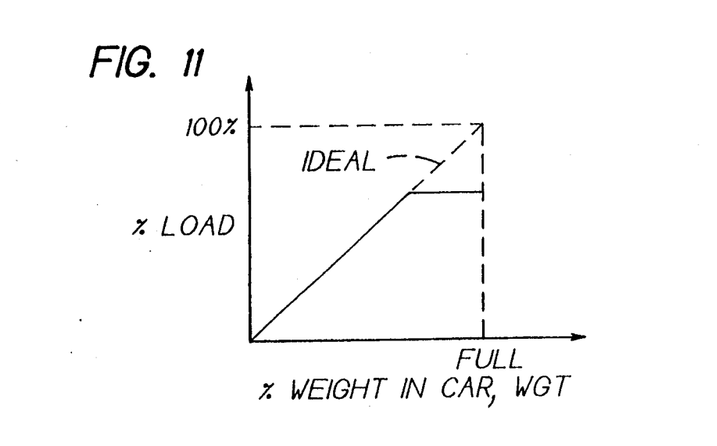

Percentage load % LOAD after use of both linear regression and mapping, that is, execution of all the steps in the routine of FIG. 5, is shown in FIG. 11.

It should be understood by those skilled in the art that various changes, omissions, and additions may be made herein without departing from the spirit and scope of the invention.

We claim:

1. Operating an elevator car within a hoistway in a succession of operating runs to service passengers, said car having a drive system including a brake and an electric motor with an armature, said car having a load weighing system, using a method comprising:

initially:
  providing pre-torque armature current to said motor to balance the torque in said drive system to achieve zero car velocity with said car empty and said brake released and providing an $I_{ARM}0$ signal indicative thereof; and
  providing pre-torque armature current to said motor to balance the torque in said drive system to achieve zero car velocity with said car carrying a known load and said brake released and providing an $I_{ARM}1$ signal indicative thereof;
then, in conjunction with each operating run of the car:
  providing pre-torque armature current to said motor to balance the torque in said drive system to achieve zero car velocity with said brake released and providing an $I_{ARM}$ signal indicative thereof, and concurrently providing a signal, % LOAD, indicative of the load in said car as determined by said load weighing system;

providing a duty weight signal, % WGT, as the difference between the current indicated by said $I_{ARM}$ signal and the current indicated by said $I_{ARM}0$ signal divided by the difference between the current indicated by said $I_{ARM}1$ signal and the current indicated by said $I_{ARM}0$ signal;

in response to said % WGT and % LOAD signals provided during a plurality of operational runs, providing a corrected % LOAD signal; and operating said car in said hoistway to service passengers utilizing processes employing said corrected % LOAD signal.

2. A method according to claim 1 wherein said % WGT and % LOAD signals provided during a plurality of operational runs are used in a pair of linear regression processes to provide a slope and an offset to relate the actual load in said car indicated by said corrected % LOAD signal to the load in said car determined by said load weighing system as indicated by said % LOAD signal.

* * * * *